United States Patent
Ranpise et al.

(10) Patent No.: US 11,206,155 B2
(45) Date of Patent: Dec. 21, 2021

(54) FILTERING ADVERTISING OF ROUTE ADVERTISEMENTS BASED ON VIRTUAL NETWORK IDENTIFIERS

(71) Applicant: Arista Networks, Inc., Santa Clara, CA (US)

(72) Inventors: Amit Dattatray Ranpise, San Jose, CA (US); Isidoros Kouvelas, Strovolos (CY); Venkit Kasiviswanathan, San Ramon, CA (US); Rajesh Kumar Semwal, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 66 days.

(21) Appl. No.: 16/655,163

(22) Filed: Oct. 16, 2019

(65) Prior Publication Data

US 2021/0119830 A1    Apr. 22, 2021

(51) Int. Cl.
*H04L 12/46*    (2006.01)
*H04L 12/721*    (2013.01)
*H04L 12/851*    (2013.01)
*H04L 12/751*    (2013.01)
*H04L 12/24*    (2006.01)

(52) U.S. Cl.
CPC ......... *H04L 12/4675* (2013.01); *H04L 41/12* (2013.01); *H04L 45/025* (2013.01); *H04L 45/26* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 7,532,631 B2 | 5/2009 | Raszuk et al. | |
| 8,937,961 B1* | 1/2015 | Vairavakkalai | H04L 45/02 370/401 |
| 9,106,530 B1* | 8/2015 | Wang | H04L 12/4641 |
| 9,374,794 B2 | 6/2016 | Ono et al. | |
| 10,637,687 B2 | 4/2020 | Brissette et al. | |
| 2006/0190570 A1* | 8/2006 | Booth, III | H04L 12/4641 709/220 |

(Continued)

FOREIGN PATENT DOCUMENTS

WO    2018090872 A1    5/2018

OTHER PUBLICATIONS

Fernando, R., et al., "Service Function Chaining using Virtual Networks with BGP VPNs draft-ietf-bess-service-chaining-06", https://tools.ietf.org/html/draft-ietf-bess-service-chaining-06, pp. 1-41, Dec. 4, 2018.

(Continued)

*Primary Examiner* — Jay L Vogel
(74) *Attorney, Agent, or Firm* — Fountainhead Law Group P.C.

(57) ABSTRACT

Virtual network identifiers are extracted from route advertisements. A table associates virtual network identifiers with provider edge devices. When a virtual network identifier extracted from a route advertisement matches a virtual network identifier in the table, the route advertisement is propagated to the provider edge devices associated with that virtual network identifier in the table. The route advertisement is not propagated to provider edge devices not associated with that virtual network identifier in the table.

18 Claims, 14 Drawing Sheets

(56) References Cited

U.S. PATENT DOCUMENTS

| | | | |
|---|---|---|---|
| 2008/0101385 A1* | 5/2008 | Elias | H04L 45/02 |
| | | | 370/401 |
| 2010/0115604 A1* | 5/2010 | Gerber | H04L 45/00 |
| | | | 726/15 |
| 2010/0214932 A1* | 8/2010 | Qian | H04L 41/0677 |
| | | | 370/244 |
| 2013/0250966 A1 | 9/2013 | Gu et al. | |
| 2016/0142310 A1* | 5/2016 | Means | H04L 45/74 |
| | | | 370/392 |
| 2016/0277210 A1 | 9/2016 | Lin et al. | |
| 2017/0195210 A1 | 7/2017 | Jacob et al. | |
| 2018/0069792 A1 | 3/2018 | Gao et al. | |
| 2018/0198712 A1 | 7/2018 | Gao et al. | |
| 2019/0288943 A1 | 9/2019 | Sivaraj et al. | |
| 2020/0358693 A1* | 11/2020 | Rawlins | H04L 45/745 |
| 2021/0006485 A1 | 1/2021 | Toyozumi et al. | |
| 2021/0152593 A1* | 5/2021 | Gao | H04L 63/14 |

OTHER PUBLICATIONS

Marques, P., "Constrained Route Distribution for Border Gateway Protocol/MultiProtocol Label Switching (BGP/MPLS) Internet Protocol (IP) Virtual Private Networks (VPNs)", RFC 4684, Network Working Group, Standards Track, https://tools.ietf.org/html/rfc4684, pp. 1-14, Nov. 2006.

Sangli, S., et al., "BGP Extended Communities Attribute", RFC 4360, Network Working Group, Standards Track, https://tools.ietf.org/html/rfc4360, pp. 1-12, Feb. 2006.

* cited by examiner

700

FILTERING ADVERTISING OF ROUTE ADVERTISEMENTS BASED ON VIRTUAL NETWORK IDENTIFIERS

BACKGROUND

The present disclosure relates to route distribution for virtual private networks (VPNs).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
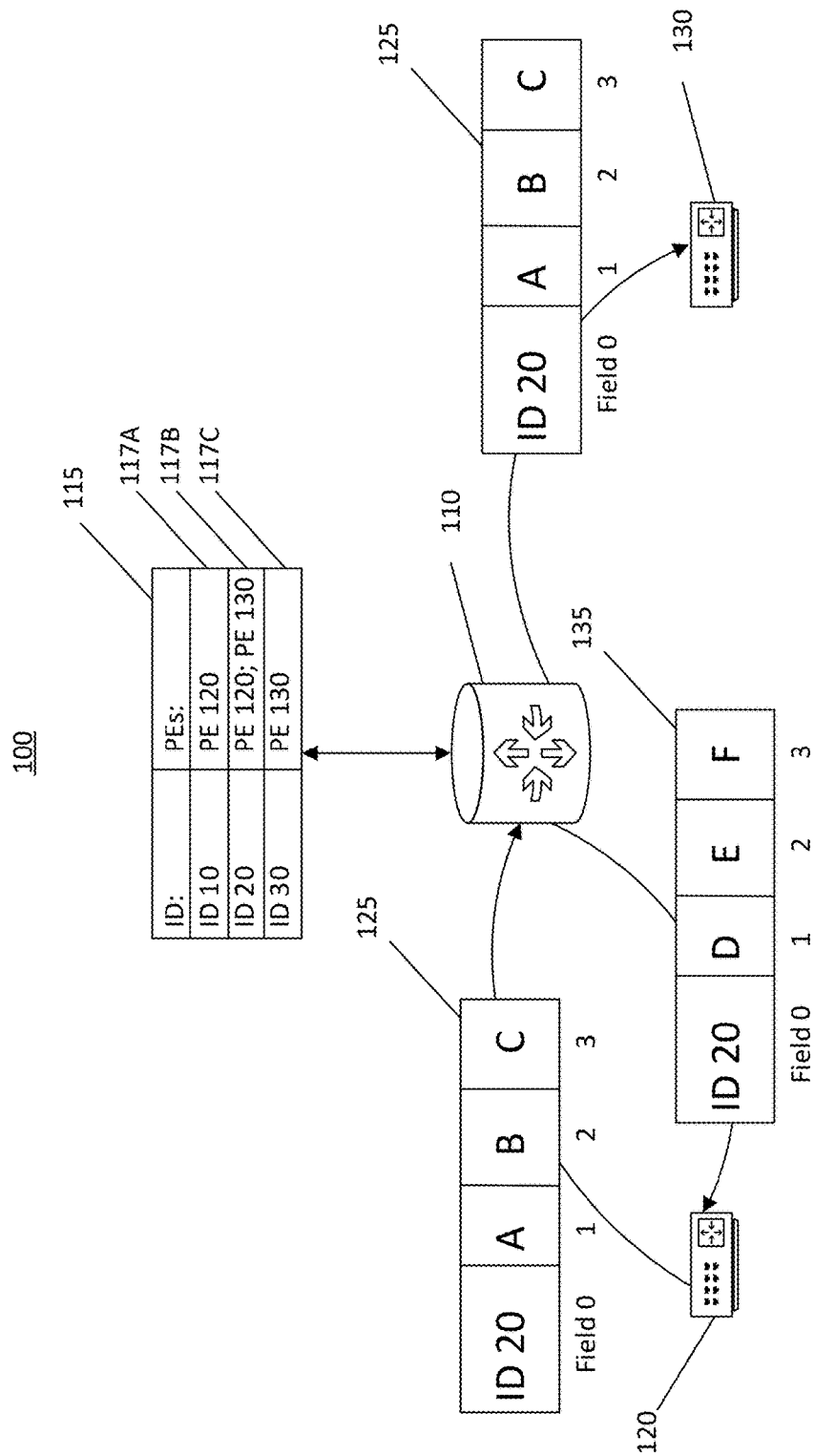
FIG. 1 shows an illustrative diagram of a system that provides necessary route advertisements to provider edge (PE) devices on a VPN, in accordance with some embodiments of the disclosure.

In VPNs using the border gateway protocol (BGP), a route reflector (or route server) may be connected to a plurality of PE devices. The PE devices may in turn be connected to one or more customer edge (CE) devices (e.g., routers, switches, or hosts) in a virtual local area network (VLAN), such as a company's internal private network that spans multiple offices. The PE devices provide route advertisements (e.g., via BGP update messages) to the route reflector, which in turn propagates the route advertisement to other PE devices (e.g., BGP and/or ethernet virtual private network (EVPN) speakers) on the network that are clients of the route reflector. BGP update messages may include multiple network layer reachability information (NLRI) entries, each of which represents a separate route. When the route reflector receives route advertisements for one or more CE devices in a VLAN, the route reflector will propagate those route advertisements to all of its client PE devices, including the PE devices that are not connected to the VLAN. Such PE devices will thus necessarily receive route advertisements they do not need. This results in significant wastage of network resources at scale, both in terms of unnecessary network traffic as well as adding unnecessary processor and memory load on route reflectors that will provide route advertisements to PE devices that do not need them, and on PE devices that will now include routes in their routing tables for CE devices they will never need to reach.

Described herein are various embodiments for addressing this problem by filtering advertising of route advertisements based on virtual network identifiers (e.g., VNIs or RTs) included in the route advertisements. In some embodiments described herein, route reflectors restrict advertising of a new route advertisement to PE devices that have advertised routes including the same VNI as is included in the new route advertisement. In other embodiments described herein, route reflectors restrict advertising of a new route advertisement to PE devices that have advertised routes including the same RT as is included in the new route advertisement. This allows route reflectors to provide to the PE devices route advertisements that they need (the route advertisements for CE devices in VLANs to which the PE devices are connected) while minimizing or eliminating advertising of route advertisements the PE devices do not need (the route advertisements for CE devices in VLANs to which the PE devices are not connected).

In some embodiments, the route reflector maintains a VNI table of VNIs that have been included in routes advertised by the various PE devices in the network. The VNI table associates the VNIs with identifiers of the PE devices that have advertised routes including the VNIs. By default, the route reflector prevents sending route advertisements to PE devices until the route reflector receives, from a PE device, a route advertisement including a VNI matching a VNI included in the VNI table. For example, upon receiving a new route advertisement from a PE device, the route reflector retrieves, from the VNI table, identifiers of other PE devices that have previously provided route advertisements including that VNI. The route reflector then (i) propagates the received new route advertisement to the identified other PE devices, and (ii) transmits to the PE device the route advertisements (including the VNI) that the route reflector previously received from the other PE devices.

The route reflector builds the VNI table by extracting one or more VNIs from route advertisements received by the route reflector. The PE device includes the VNI of the VLAN in each route advertisement for the VLAN that the PE device provides to the route reflector. Upon receiving the route advertisement, the route reflector (i) extracts the VNI, and (ii) adds the PE device to a record in the VNI table for the VNI extracted from the route advertisement. In some embodiments, a route advertisement may include multiple VNIs, and the above-described process may be repeated for each VNI.

In other embodiments, the route reflector maintains a RT table of RTs that have been included in routes advertised by the various PE devices in the network. The RT table associates the RTs with identifiers of the PE devices that have advertised routes including the RTs. By default, the route reflector prevents sending route advertisements to PE devices until the route reflector receives, from a PE device, a route advertisement including a RT matching the RT included in the RT table. For example, upon receiving a new route advertisement from a first PE device, the route reflector retrieves, from the RT table, identifiers of other PE devices that have previously provided route advertisements including that RT. The route reflector then (i) propagates the received new route advertisement to the identified other PE devices, and (ii) transmits to the first PE device the route advertisements (including the RT) that the route reflector previously received from the other PE devices.

To build the RT table, the route reflector extracts one or more RTs from route advertisements received by the route reflector. In some embodiments, the RT may be an export RT or an import RT. At least one export RT and at least one import RT for a VLAN (or set of VLANs) are preconfigured on a PE device connected to the VLAN. The PE device includes the export RT in a route target BGP path attribute (e.g., a route target-type BGP extended community path attribute) of each route advertisement for the VLAN that the PE device provides to the route reflector. Export RTs and import RTs are often the same (i.e., symmetrical), but that is not always true. In embodiments where the export RT and the import RT are not symmetrical, the PE device includes (or encodes) a RT value based on the import RT for the VLAN in a predetermined non-route target BGP path attribute (e.g., a non-route target-type BGP community attribute or non-route target-type BGP extended community attribute) of the route advertisement. In such embodiments, the RT value may be a full RT (e.g., the import RT), a partial RT, or another value (or combination of values) that can be mapped to a RT (or from which a RT can be derived).

To determine whether to use the RT from a route target BGP path attribute or to extract the RT from an RT value included in a non-route target BGP path attribute, the route reflector, upon receiving a route advertisement from a PE device, determines whether the non-route target BGP path attribute includes an RT value. If the non-route target BGP path attribute includes the RT value, the route reflector (i) extracts or derives the RT from the RT value included in the non-route target BGP path attribute, and (ii) adds the PE device to a record in the RT table for the RT. If the route advertisement does not include a non-route target BGP path attribute having a RT value, the route reflector (i) uses the RT from the route target BGP path attribute, and (ii) adds the PE device to a record in the RT table for the RT from the route target BGP path attribute. In some embodiments, a route advertisement may include multiple RTs and/or RT values, and the above-described process may be repeated for each RT and/or RT value. For example, the route advertisement may include multiple RTs in route target BGP path attributes and/or multiple RT values in non-route target BGP path attributes.

In some embodiments, upon receiving a route advertisement, the route reflector first determines whether the route advertisement is an EVPN type 3 route advertisement. If the route advertisement is not an EVPN type 3 route advertisement, the route reflector does not examine the route advertisement for the purpose of maintaining VNI or RT table entries. On the other hand, if the route advertisement is an EVPN type 3 route advertisement, the route reflector performs the steps described above.

FIG. 1 shows an illustrative diagram of a system that provides necessary route advertisements to PE devices on a VPN, in accordance with some embodiments of the disclosure. In particular, FIG. 1 depicts a system 100 including a route reflector 110 connected to two PE devices—PE device 120 and PE device 130. As noted above, PE devices, such as PE devices 120 and 130, may be any network device that connects to and advertises network reachability information for one or more VPNs. Route reflector 110 maintains a route eligibility table 115 that includes records (e.g., records 117A, 117B, and 117C as shown in FIG. 1) associating virtual network identifiers (e.g., VNIs or RTs, depicted in FIG. 1 as "ID 10," ID 20," and "ID 30") with identifiers of PE devices. As described further below with reference to FIGS. 4A-D, 7A, and 7B, route reflector 110 generates a record (e.g., record 117B) for a virtual network identifier (e.g., ID 20) when route reflector 110 first receives a route advertisement (e.g., route advertisement 125) including that virtual network identifier. For example, upon receiving route advertisement 125, route reflector 110 extracts a virtual network identifier (e.g., ID 20) from a data field (e.g., field 0) of route advertisement 125. Route reflector 110 then adds an identifier of a PE device (e.g., PE device 120) that is the source of the route advertisement to the record for the virtual network identifier. Route reflector 110 further adds an identifier of additional PE devices to the record for the virtual network identifier when route reflector 110 receives route advertisements including the virtual network identifier from the additional PE devices.

If route eligibility table 115 already includes a record for the virtual network identifier included in a received route advertisement, route reflector 110 extracts, from the record for that virtual network identifier, an identifier of another PE device (e.g., PE device 130) and transmits the received route advertisement to the other PE device. For example, as shown in FIG. 1, route reflector 110 transmits route advertisement 125 to PE device 130. Route reflector 110 does not transmit route advertisement 125 to other PE devices that are not included in record 117B for ID 20 in route eligibility table 115. Additionally, route reflector 110 identifies a route (including the virtual network identifier) that was previously advertised by the other PE device (e.g., PE device 130), and transmits a route advertisement (e.g., route advertisement 135) including that route to the first PE device (e.g., PE device 120). For example, as shown in FIG. 1, route reflector 110 transmits route advertisement 135 to PE device 120.

As shown in FIG. 1, route advertisements 125 and 135 include a plurality of data fields (depicted as fields 0, 1, 2, and 3). Those skilled in the art will appreciate that this is a generalized representation of a route advertisement that is intended to be illustrative, and that route advertisements may be generated according to various different formats and/or syntaxes. In particular, route advertisements may include fields for VNIs, RTs, and/or various other BGP community attributes and BGP extended community attributes.

Figure 2:
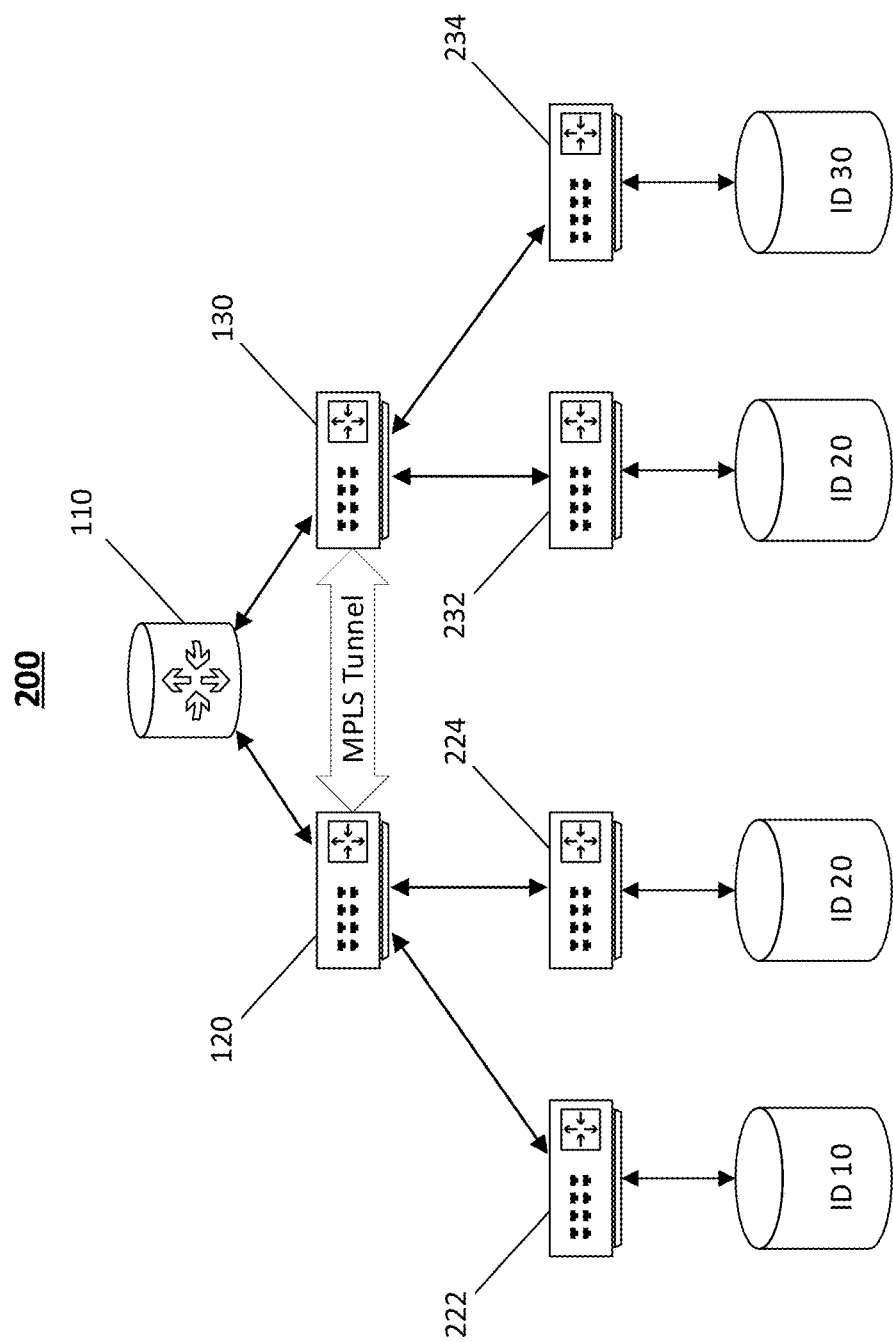
FIG. 2 shows an illustrative network topology of a system for providing necessary route advertisements to PE devices on a VPN, in accordance with some embodiments of the disclosure.

FIG. 2 shows an illustrative network topology of a system for providing necessary route advertisements to PE devices on a VPN, in accordance with some embodiments of the disclosure. In particular, FIG. 2 shows a network 200, which includes route reflector 110 and PE devices 120 and 130 of FIG. 1. In some embodiments (as shown in FIG. 2), route reflector 110 is a route server or other network device that is not in the data path between other devices (e.g., PE devices 120 and 130) in network 200, and is configured to distribute network layer reachability information (NLRI) in network 200. In other embodiments (not shown in FIG. 2), route reflector 110 is a router, switch, or other L3 device that is in a data path between devices on network 200 and is also configured to distribute NLRI between the other devices in network 200. In some embodiments, network 200 may include multiple route reflectors (not shown in FIG. 2) providing redundant functionality with route reflector 110.

PE device 120 is connected to a customer edge (CE) device 222, which is connected to a VLAN identified by virtual network identifier ID 10, and CE device 224, which is connected to a first portion of a VLAN identified by virtual network identifier ID 20. Likewise, PE device 130 is connected to a CE device 232, which is connected to a second portion of the VLAN identified by virtual network identifier ID 20, and a CE device 234, which is connected to a VLAN identified by virtual network identifier ID 30. In addition to PE devices 120 and 130, CE devices 222, 224, 232, and 234, and the VLANS identified by virtual network identifiers ID 10, ID 20, and ID 30, network 200 may further include any number of additional PE devices, CE devices, and/or VLANS, but only the above-noted components are shown in FIG. 2 to avoid overcomplicating the drawing. PE devices 120 and 130 may be routers, L3 switches, and/or other network devices configured to generate route advertisements corresponding to CE devices. CE devices 222, 224, 232, and 234 may be routers, L3 switches, other network devices configured to generate route advertisements and/or serve as gateways for VLANs, and/or hosts, servers, hypervisors, or any other devices that have media access control (MAC) addresses.

Thus, in the example shown in FIG. 2, the VLAN identified by virtual network identifier ID 20 is split between CE devices 224 and 232 (i.e., one portion of the VLAN identified by virtual network identifier ID 20 is connected to CE device 224, and the other portion of the VLAN identified by virtual network identifier ID 20 is connected to CE device 232).

In some embodiments, network 200 is a multiprotocol label switching (MPLS)-based layer 2 (L2) or layer 3 (L3) ethernet virtual private network (EVPN) in which the PE devices 120 and 130 (as well as other devices not shown in FIG. 1) maintain a BGP EVPN session with route reflector 110, and exchange EVPN type 3 routes among each other.

Network 200 has data plane connectivity provided by MPLS tunnels between PE devices 120 and 130. Thus, CE device 224 is connected to CE device 232 via the MPLS tunnels, for example, an MPLS tunnel between PE devices 120 and 130. Due to the connection between CE devices 224 and 232, a single IP routing table, such as an IP virtual routing and forwarding (VRF) table and/or a bridging table, for the VLAN identified by virtual network identifier ID 20 can span both portions of the VLAN, connected to CE devices 224 and 232, respectively.

While FIG. 1 shows each of PE devices 120 and 130 having direct connections to route reflector 110, those skilled in the art will appreciate that additional route reflectors may be included in network 200 and/or interspersed between PE devices 120 and 130 without departing from the scope of the present disclosure. In some embodiments, route reflector 110, PE device 120, and/or PE device 130 may be configured to act as BGP speakers for network 200. Additionally or alternatively, an additional device not shown in FIG. 2 may be configured to act as a BGP speaker for network 200.

In some embodiments, PE devices 120 and 130 may maintain an EVPN session with route reflector 110. In such embodiments, PE devices 120 and 130 exchange routes with route reflector 110. Route reflector 110 generates and maintains route eligibility table 115 associating virtual network identifiers with identifiers of the PE devices that have provided route advertisements for the VLANs identified by the virtual network identifiers, as described above with reference to FIG. 1, and below with reference to FIGS. 4A-D, FIG. 7A, and FIG. 7B. For example, as shown in route eligibility table 115 of FIG. 1, the VLAN identified by virtual network identifier ID 10 is associated with only PE device 120, the VLAN identified by virtual network identifier ID 20 is associated with both PE devices 120 and 130, and the VLAN identified by virtual network identifier ID 30 is associated with only PE device 130.

As further described below, when route reflector 110 receives a route advertisement including a type 3 EVPN route from PE device 120 for the VLAN (e.g., the VLAN identified by virtual network identifier ID 20), route reflector 110 searches route eligibility table 115 using ID 20 as a key to determine which PE devices are eligible to receive the route advertisement, determines that PE device 130 is eligible to receive the route advertisement, and transmits the route advertisement to PE device 130.

Figure 3:
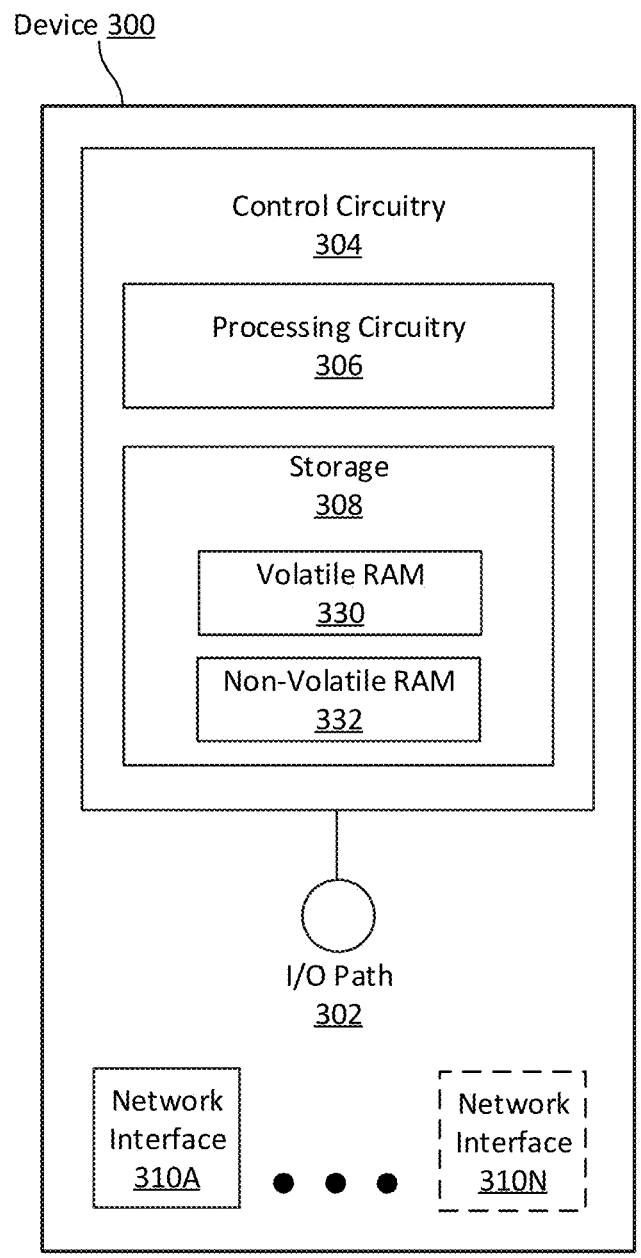
FIG. 3 shows a diagram of an illustrative network device for providing necessary route advertisements to PE devices on a VPN, in accordance with some embodiments of the disclosure.

FIG. 3 shows a generalized embodiment of a network device usable in a system for providing necessary route advertisements to PE devices on a VPN, in accordance with some embodiments of the disclosure. In particular, device 300 of FIG. 3 may be any of the devices depicted in FIGS. 1 and 2 (e.g., route reflector 110, PE devices 120 and 130, and CE devices 222, 224, 232, and 234). Device 300 may be a router, a L3 switch, a route server, a network controller (not shown in FIG. 1 or 2), and/or any other computing device that may be configured to generate or propagate route advertisements (e.g., route advertisements 125 and 135). Device 300 may receive data via one or more network interfaces 310A-310N and provide the received data to control circuitry 304 via an input/output (I/O) path 302. Control circuitry 304 includes processing circuitry 306 and storage 308. Storage 308 may include volatile memory 330 (such as random-access memory (RAM), for example, static RAM and/or dynamic RAM), which does not retain its contents when power is turned off, and non-volatile memory 332 (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to one or more network interfaces 310A-310N, which in turn connect device 300 to one or more other devices (e.g., PE devices 120 and 130). For example, I/O path 302 may provide a route advertisement received from PE device 120 via network interface 310A to control circuitry 304.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for filtering advertising of route advertisements (e.g., route advertisements 125 and 135) based on a route eligibility table (e.g., table 115). For example, control circuitry 304 may (i) receive route advertisement 125 via a network interface (e.g., network interface 310A) from PE device 120 and (ii) store a route included in route advertisement 125 in storage 308 (e.g., volatile RAM 330). Control circuitry 304 may (iii) extract, from the route, a virtual network identifier and (iv) search route eligibility table 115 for an entry for the virtual network identifier. If an entry for the virtual network identifier is found, control circuitry 304 may (v) extract, from the entry, an identifier of another PE device (e.g., PE device 130) and (vi) transmit route advertisement 125 to PE device 130. Control circuitry 304 may further transmit, via a network interface (e.g., network interface 310B), route advertisement 135, for a route that includes the same virtual network identifier and that was advertised by PE device 130, to PE device 120.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions.

As noted above, various types of virtual network identifiers may be used with the embodiments described herein. Two illustrative examples of virtual network identifiers, VNIs and RTs, will now be described with reference to FIGS. 4A-8, along with the various processes and sub-processes for filtering route advertisements based on the VNIs or RTs included in the route advertisements. In particular, FIGS. 4A, 4B, 4C, 4D, 5, and 6 describe embodiments where the virtual network identifiers are VNIs, and FIGS. 7A, 7B, 8A, 8B, 9, and 10 describe embodiments where the virtual network identifiers are RTs. While the embodiments that follow are described in terms of VNIs or RTs, those skilled in the art will appreciate that other types of virtual network identifiers may be substituted for the VNIs or RTs without departing from the scope of the present disclosure.

FIGS. 4A, 4B, 4C, and 4D show a flowchart of an illustrative process 400 for filtering advertising of route advertisements to PE devices based on VNIs included in the route advertisements, in accordance with some embodiments of the present disclosure. For example, process 400 propagates route advertisements to PE devices that need the routes included in the route advertisements and prevents advertising of route advertisements to PE devices that do not need the routes.

Process 400 may begin at block 402, where control circuitry, such as control circuitry 304 of device 300 (FIG. 3), receives a route advertisement from a PE device. For example, control circuitry 304 receives route advertisement 125 from PE device 120. Route advertisement 125 includes one or more data fields (e.g., fields 0, 1, 2, and 3, as shown in FIG. 1), at least one of which includes a VNI (e.g., VNI 20 in the example shown in FIG. 1) identifying a VLAN. For example, the VNI may be included in a field of an MPLS label included in the route advertisement. Control circuitry 304 may receive route advertisement 125 via a network interface (e.g., network interface 310A of FIG. 3). In some embodiments, route advertisement 125 includes multiple VNIs.

At block 404, control circuitry 304 extracts, from the route advertisement received at block 402, a VNI. For example, control circuitry 304 extracts, from route advertisement 125, VNI 20. Control circuitry 304 may extract the VNI by retrieving data from a predetermined data field (e.g., field 0 as shown in FIG. 1) of route advertisement 125. The predetermined data field may be a data field that is designated for the VNI.

At block 406, control circuitry 304 determines whether a datastore includes a record for the VNI extracted at block 404. For example, control circuitry 304 may determine whether route eligibility table 115 (stored in memory 308) includes a record for VNI 20. Control circuitry 304 may search route eligibility table 115 using VNI 20 as a key to determine whether route eligibility table 115 includes a record for VNI 20. In response to determining that the datastore does not include a record for the VNI, process 400 proceeds to block 412 of FIG. 4B. In response to determining that the datastore includes a record for the VNI, process 400 separates into two paths and proceeds to both block 408 and block 420 (of FIG. 4D).

At block 408, control circuitry 304 retrieves, from the record identified at block 406, an identifier of another PE device. For example, control circuitry 304 may retrieve record 117B of FIG. 1 and extract, from record 117B, an identifier of PE device 130. Next, at block 410, control circuitry 304 transmits, to the PE device whose identifier was retrieved at block 408, the route advertisement received at block 402. For example, control circuitry 304 may transmit route advertisement 125 to PE device 130. After block 410, process 400 proceeds to block 416 of FIG. 4C.

Figure 4A:
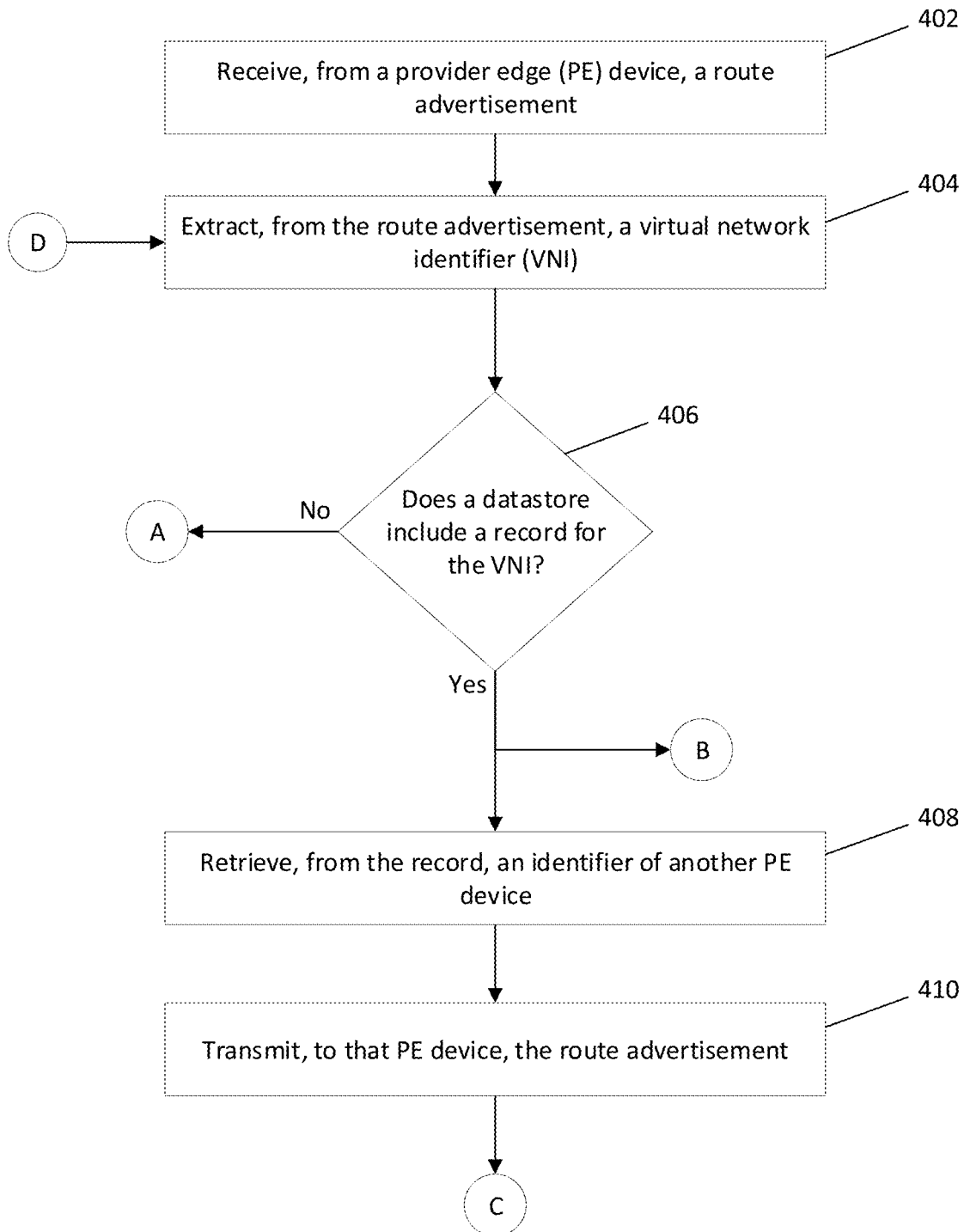
FIG. 4A shows an illustrative diagram of a procedure for filtering advertising of route advertisements to PE devices based on a virtual extensible local area network (VXLAN) network identifier (VNI) included in the route advertisements, in accordance with some embodiments of the present disclosure.
Figure 4B:
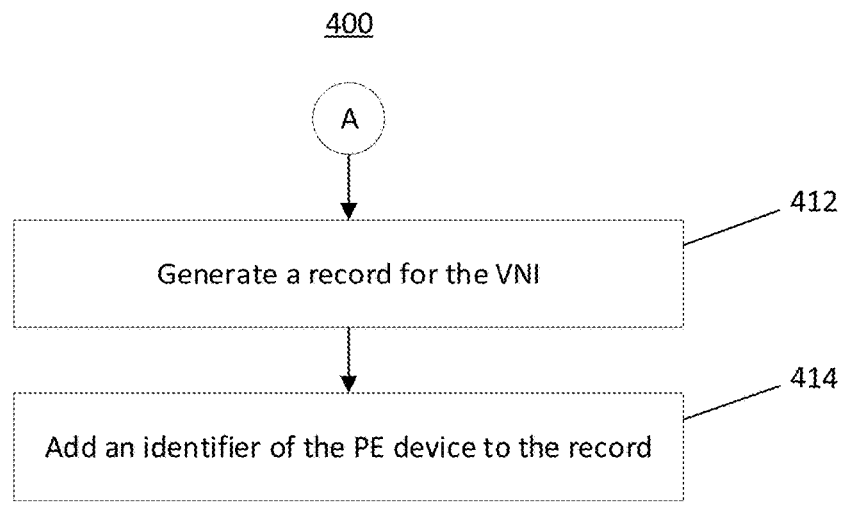
FIG. 4B shows additional aspects of the procedure of FIG. 4A, in accordance with some embodiments of the present disclosure.

At block 412 of FIG. 4B, control circuitry 304 generates a record for the VNI extracted at block 404. For example, control circuitry 304 may add an entry to route eligibility table 115 for VNI 20. Thereafter, at block 414, control circuitry 304 adds an identifier of the PE device (from which the route advertisement was received at block 402) to the record. For example, control circuitry 304 may add an identifier of PE 120 to the record generated at block 412.

Figure 4C:
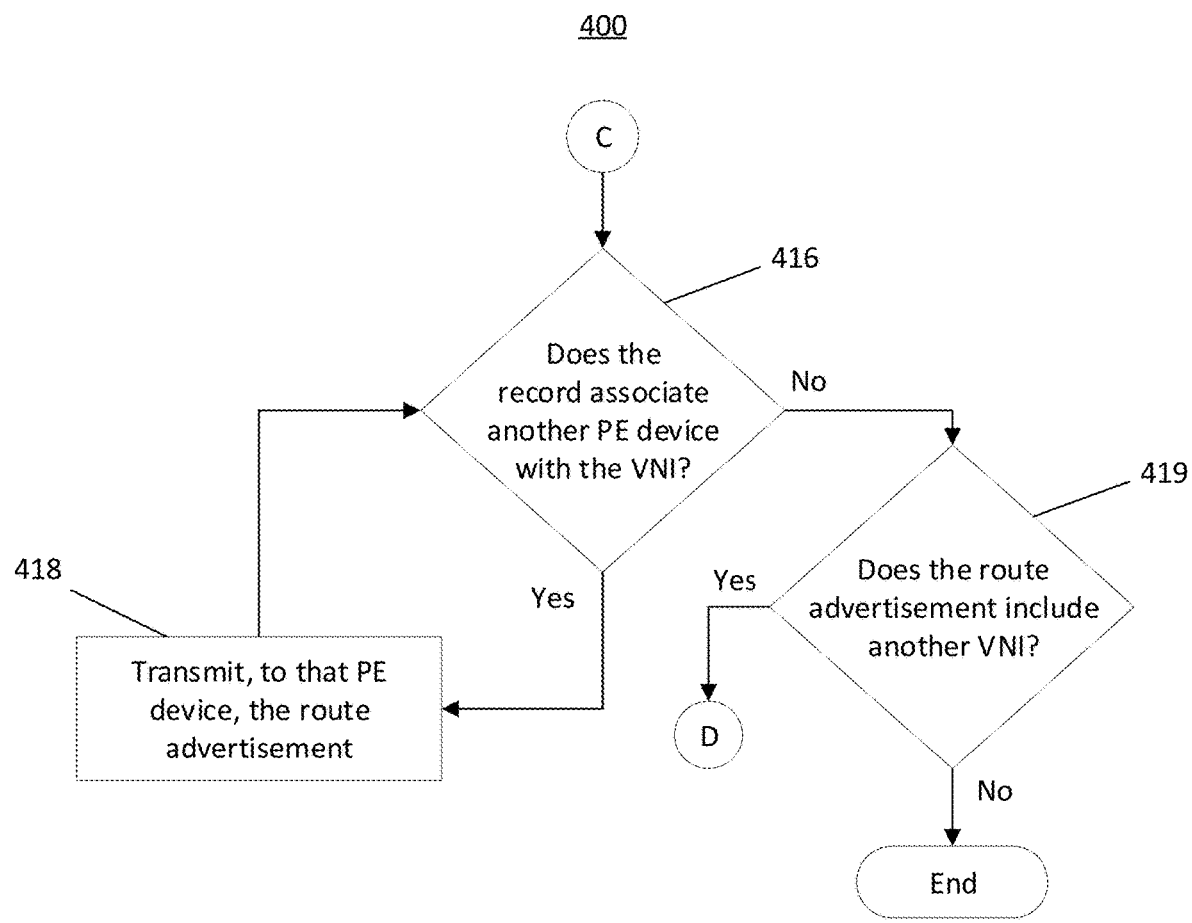
FIG. 4C shows additional aspects of the procedure of FIG. 4A, in accordance with some embodiments of the present disclosure.

At block 416 of FIG. 4C, control circuitry 304 determines whether the record identified at block 406 associates another PE device with the VNI extracted at block 404. For example, control circuitry 304 may parse record 117B to determine if record 117B includes an identifier for another PE device. In the example shown in FIG. 1, record 117B for VNI 20 in route eligibility table 115 includes an identifier of PE device 120 and an identifier of PE device 130. Thus, the control circuitry 304 may determine that record 117B for VNI 20 includes an identifier for PE device 130. In response to determining that the record associates another PE device with the VNI, process 400 proceeds to block 418 where control circuitry 304 transmits the route advertisement received at block 402 to the PE device identified at block 416. For example, control circuitry 304 may transmit route advertisement 125 to PE device 130. Thereafter, process 400 returns to block 416, where control circuitry 304 determines whether the record identified at block 406 associates another PE device with the VNI extracted at block 404. In response to determining that the record does not associate another PE device with the VNI, control circuitry 304 does not transmit the route advertisement received at block 402 to other PE devices, and process 400 proceeds to block 419.

At block 419, control circuitry 304 determines whether the route advertisement, received at block 402, includes another VNI. For example, control circuitry 304 may determine whether a predetermined data field of route advertisement 125 includes another VNI that is different from the VNI extracted at block 404. In response to determining that the route advertisement includes another VNI, process 400 returns to block 404, where control circuitry 304 extracts the other VNI from the route advertisement. In response to determining that the route advertisement does not include another VNI, process 400 ends. In some embodiments, control circuitry 304 refrains from transmitting the route advertisement received at block 402 to other PE devices. For example, even though there are other PE devices on network 100, control circuitry 304 will not transmit route advertisement 125 to those other PE devices that are not associated with VNI 20 in record 117B.

Figure 4D:
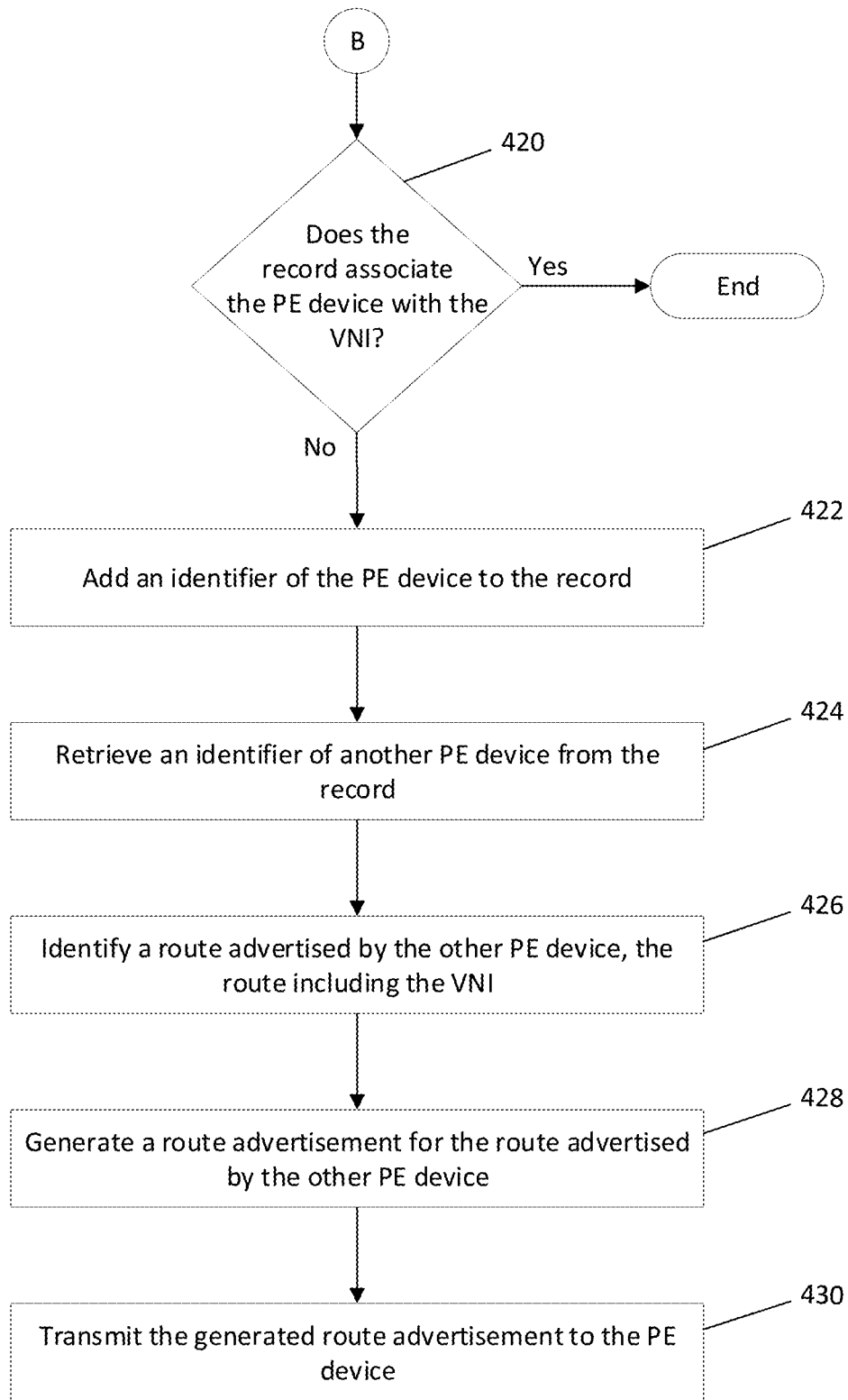
FIG. 4D shows additional aspects of the procedure of FIG. 4A, in accordance with some embodiments of the present disclosure.

At block 420 of FIG. 4D, control circuitry 304 determines whether the record associates the PE device, from which the route advertisement was received at block 402, with the VNI extracted at block 404. For example, control circuitry 304 may determine whether record 117B associates PE device 120 with VNI 20. In some embodiments, control circuitry 304 may parse record 117B to determine whether the record includes an identifier for PE device 120. In response to determining that the record associates the PE device, from which the route advertisement was received, with the VNI, process 400 ends. In response to determining that the record does not associate that PE device with the VNI, process 400 proceeds to block 422.

At block 422, control circuitry 304 adds an identifier of the PE device, from which the route advertisement was received at block 402, to the record identified at block 406. For example, control circuitry 304 may add an identifier of PE 120 to the record. Thereafter, at block 424, control circuitry 304 retrieves an identifier of another PE device from the record identified at block 406. For example, control circuitry 304 may retrieve record 117B and extract, from record 117B, an identifier of PE device 130.

At block 426, control circuitry 304 identifies a route advertised by the other PE device (identified at block 424), the route including the same VNI as extracted at block 404. For example, control circuitry 304 may retrieve, from a routing table stored in storage 308, a route that was advertised by PE device 130 and that included VNI 20. Next, at block 428, control circuitry 304 generates a route advertisement for the route (identified at block 426) advertised by the other PE device (identified at block 424). For example, control circuitry 304 may generate route advertisement 135 including the route identified at block 426. Thereafter, at block 430, control circuitry 304 transmits the route advertisement generated at block 428 to the PE device from which the initial route advertisement was received at block 402. For example, if the record for VNI 20 already exists, but PE device 120 is not associated with the record (i.e., an identifier of PE device 120 is not included in the record), another PE device must have previously provided a route advertisement for the VLAN identified by VNI 20. Thus, when control circuitry 304 adds the identifier of PE device 120 to the existing record for VNI 20, control circuitry 304 also transmits a route advertisement including the previously received route for the VLAN identified by VNI 20 to PE device 120.

Figure 5:
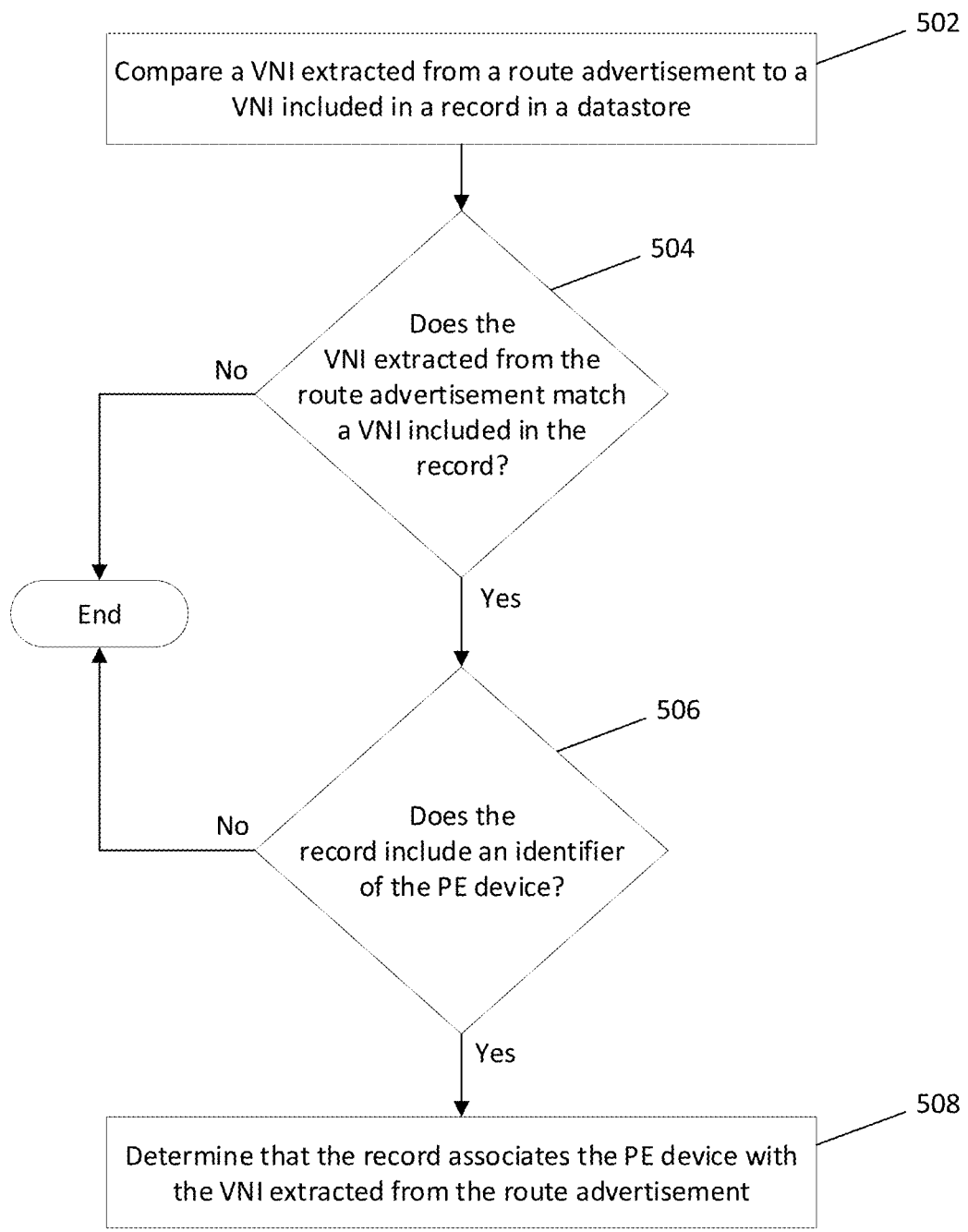
FIG. 5 is a flowchart of an illustrative process for determining whether a record in a VNI table associates a PE device with a VNI extracted from a route advertisement, in accordance with some embodiments of the present disclosure.

FIG. 5 is a flowchart of a detailed illustrative process for determining whether a record in a VNI table associates a PE device with a VNI extracted from a route advertisement, in accordance with some embodiments of the present disclosure. A process 500 for determining whether a record in a VNI table associates a PE device with a VNI extracted from a route advertisement, in accordance with some embodiments of the present disclosure, may begin at block 502 where control circuitry, such as control circuitry 304 of device 300 (FIG. 3), compares a VNI extracted from a route advertisement to a VNI included in a record included in a datastore. For example, control circuitry 304 may search the record using the VNI extracted at block 404 (FIG. 4) as a key, and/or may compare the VNI extracted at block 404 with one or more VNIs included in the record.

At block 504, control circuitry 304 determines whether the VNI extracted from the route advertisement matches a VNI included in the record. For example, control circuitry 304 may determine, based on the comparing performed at block 502, whether VNI 20 matches a VNI included in the record. In response to determining that the VNI extracted from the route advertisement does not match a VNI included in the record, process 500 ends. In response to determining that the VNI extracted from the route advertisement matches a VNI included in the record, process 500 proceeds to block 506.

At block 506, control circuitry 304 determines whether the record includes an identifier for the PE device from which the route advertisement was received. For example, control circuitry 304 may parse the record for VNI 20 to determine if the record includes an identifier for PE device 120. In response to determining that the record does not include an identifier for the PE device, process 500 ends. In response to determining that the record includes an identifier for the PE device, process 500 proceeds to block 508.

At block 508, control circuitry 304 determines that the record associates the PE device with the VNI extracted from the first route advertisement. For example, control circuitry 304 may determine that the record for VNI 20 associates VNI 20 with PE device 120, based on the identifier of PE device 120 being included in the record for VNI 20.

Figure 6:
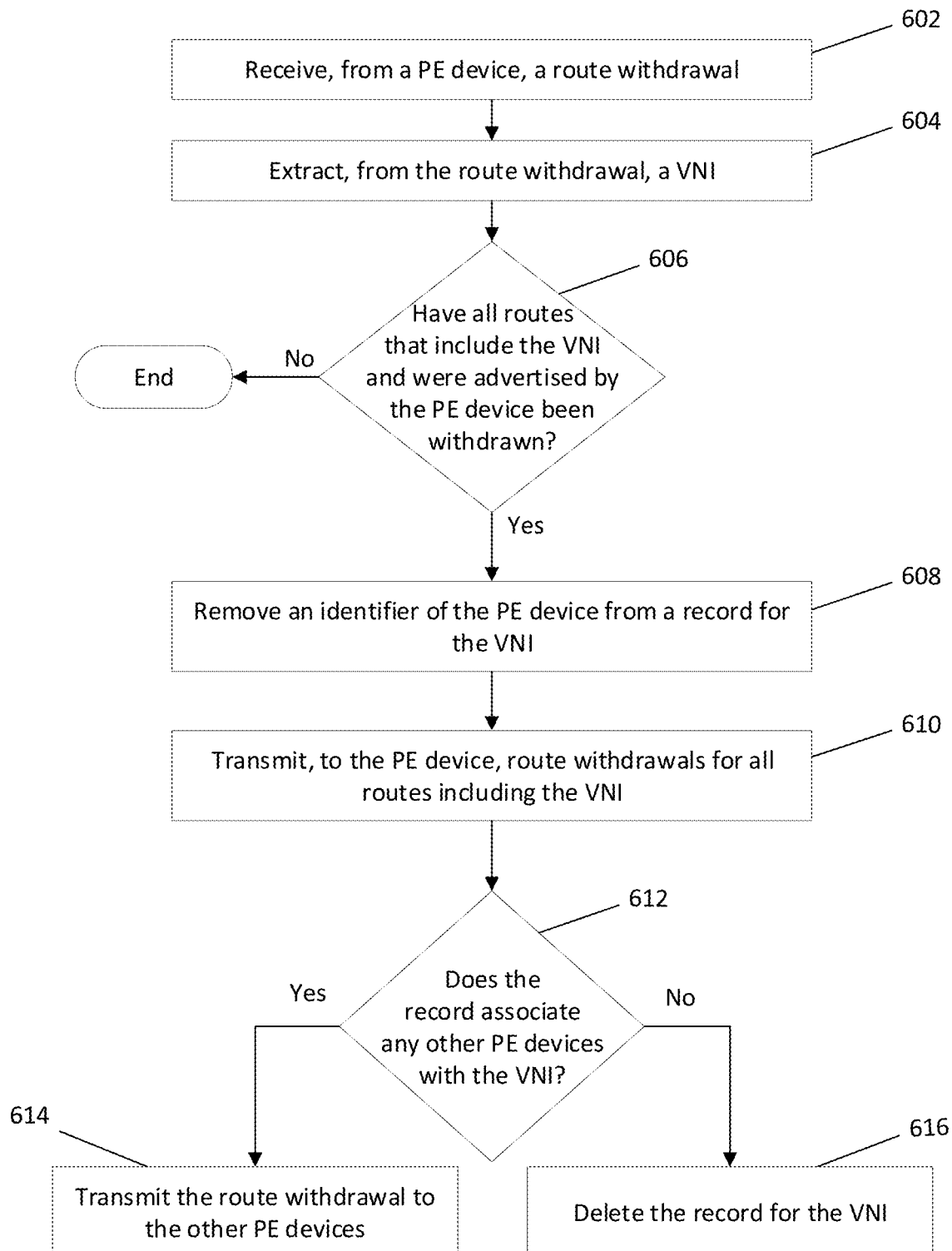
FIG. 6 is a flowchart of an illustrative process for deleting an identifier of a PE device from a record for a VNI, in accordance with some embodiments of the present disclosure.

FIG. 6 is a flowchart of an illustrative process 600 for removing an identifier of a PE device from a record for a VNI, in accordance with some embodiments of the present disclosure. Process 600 may begin at block 602, where control circuitry, such as control circuitry 304 of device 300 (FIG. 3), receives, from a PE device, a route withdrawal. For example, control circuitry 304 receives a route withdrawal from PE device 120. The route withdrawal may include fields similar to the fields of route advertisement 125 (described above with reference to FIG. 1), at least one of which includes a VNI (e.g., VNI 20 in the example shown in FIG. 1) identifying a VLAN. For example, the VNI may be included in a field of an MPLS label included in the route advertisement. Control circuitry 304 may receive the route withdrawal via a network interface (e.g., network interface 310A of FIG. 3). In some embodiments, the route withdrawal includes multiple VNIs.

At block 604, control circuitry 304 extracts, from the route withdrawal received at block 602, a VNI. For example, control circuitry 304 extracts, from the route withdrawal, VNI 20. Control circuitry 304 may extract the VNI by retrieving data from a predetermined data field of the route withdrawal. The predetermined data field may be a data field that is designated for the VNI.

At block 606, control circuitry 304 determines whether all routes advertised by the PE device, and that included the same VNI as the route withdrawn at block 602, have been withdrawn. In other words, control circuitry 304 determines whether any routes advertised by the PE device that include the same VNI as the route withdrawn at block 602 have not been withdrawn and thus are still active. For example, control circuitry 304 may search a routing table, stored in storage 308, for all routes advertised by the PE, and then filter out any routes that do not include VNI 20. In response to determining that all routes advertised by the PE device and that included VNI 20 have not yet been withdrawn, process 600 ends. In response to determining that all routes advertised by the PE device and that included VNI 20 have been withdrawn, process 600 proceeds to block 608.

At block 608, control circuitry 304 removes an identifier of the PE device from a record for the VNI. For example, control circuitry 304 may remove, from the record generated at block 412, the identifier of the PE device that was added to the record at block 414.

At block 610, control circuitry 304 transmits, to the PE device, route withdrawals for all routes that include the VNI and were previously advertised to the PE device. For example, control circuitry 304 may identify all the routes that were previously advertised to the PE device at block 418 and transmit, to the PE device, route withdrawals for all those routes.

At block 612, control circuitry 304 determines whether the record for the VNI associates any other PE devices with the VNI. For example, control circuitry 304 may determine whether the record for the VNI that was identified at block 406 includes identifiers of other PE devices. In response to determining that the record for the VNI associates other PE devices with the VNI, process 600 proceeds to block 614. In response to determining that the record for the VNI does not associate other PE devices with the VNI, and thus the record for the VNI is not associated with any PE devices after the identifier of the PE device is removed at block 608, process 600 proceeds to block 616.

At block 614, control circuitry 304 transmits the route withdrawal, received at block 602, to the other PE devices. For example, control circuitry 304 may retrieve, from the record for the VNI, identifiers of the other PE devices associated with the VNI and transmit the route withdrawal received at block 602 to those PE devices.

At block 616, control circuitry 304 deletes the record for the VNI. For example, control circuitry 304 removes the record for VNI 20 from route eligibility table 115.

Figure 7A:
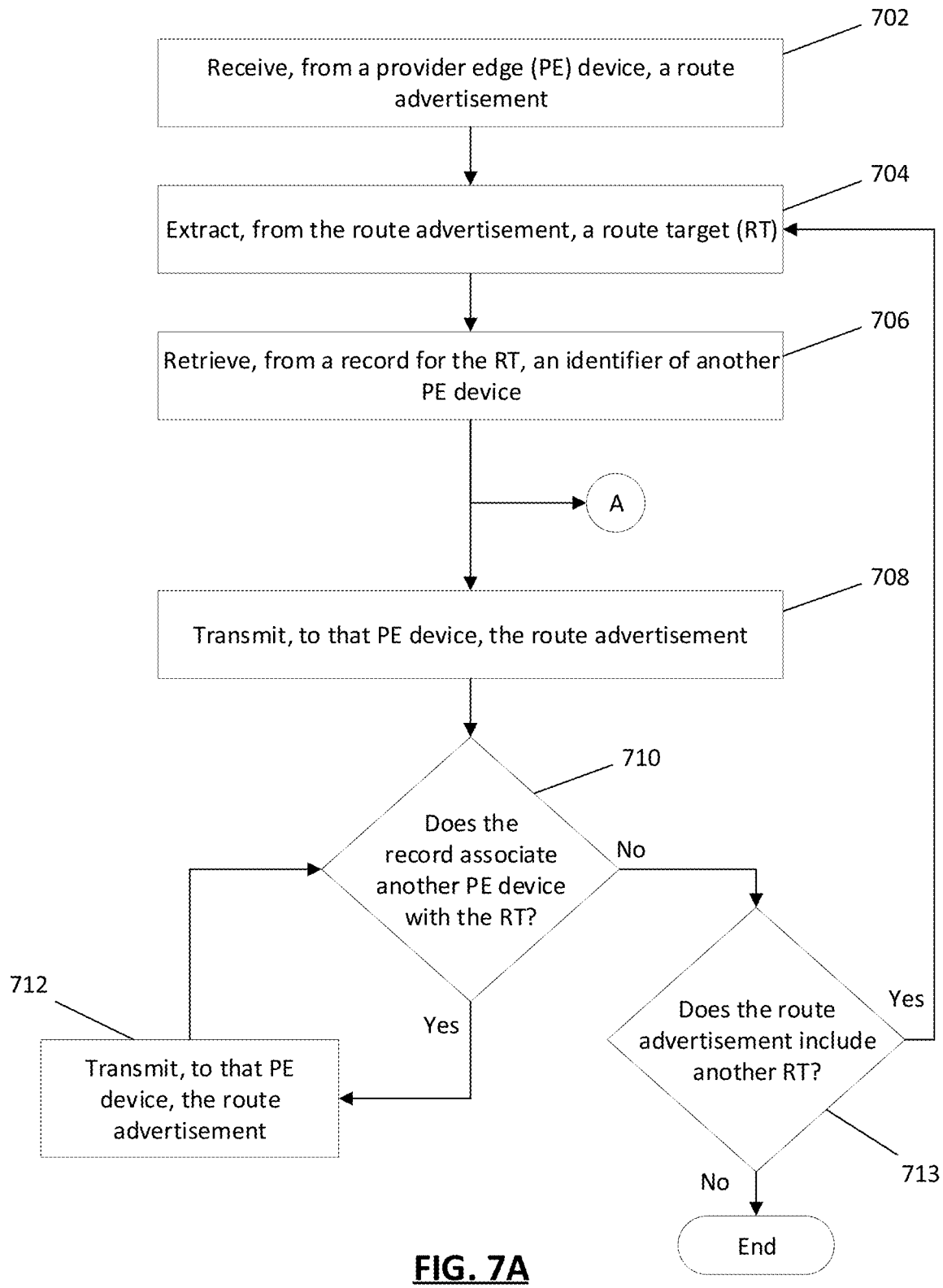
FIG. 7A is a flowchart of an illustrative process for filtering advertising of route advertisements to PE devices based on a route target (RT) included in the route advertisements, in accordance with some embodiments of the present disclosure.
Figure 7B:
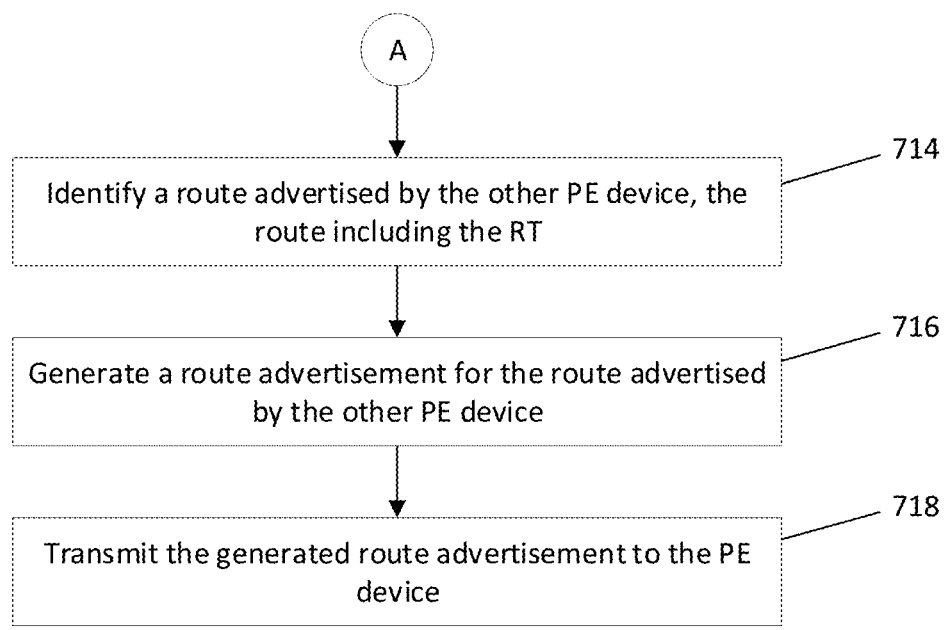
FIG. 7B shows additional aspects of the procedure of FIG. 7A, in accordance with some embodiments of the present disclosure.

FIGS. 7A and 7B show a flowchart of an illustrative process 700 for filtering advertising of route advertisements to PE devices based on RTs included in the route advertisements, in accordance with some embodiments of the present disclosure. Similar to process 400 of FIGS. 4A-4D, process 700 propagates route advertisements to PE devices that need the routes included in the route advertisements and prevents advertising of route advertisements to PE devices that do not need the routes.

Process 700 may begin at block 702, where control circuitry, such as control circuitry 304 of device 300 (FIG. 3), receives a route advertisement from a PE device. For example, control circuitry 304 receives route advertisement 125 from PE device 120. Route advertisement 125 includes one or more data fields (e.g., fields 0, 1, 2, and 3, as shown in FIG. 1), at least one of which includes a RT (e.g., RT 20 in the example shown in FIG. 1) identifying a VLAN. For example, the RT may be included in a route target path attribute included in the route advertisement. Control circuitry 304 may receive route advertisement 125 via a network interface (e.g., network interface 310A of FIG. 3). In some embodiments, route advertisement 125 includes multiple RTs.

At block 704, control circuitry 304 extracts, from the route advertisement received at block 702, a RT. For example, control circuitry 304 extracts, from route advertisement 125, RT 20. Control circuitry 304 may extract RT 20 by retrieving data from a predetermined data field (e.g., field 0 as shown in FIG. 1) of route advertisement 125. The predetermined data field may be a data field that is designated for the RT, such as a route target path attribute.

At block 706, control circuitry 304 retrieves, from a record for the RT extracted at block 704, an identifier of another PE device. For example, control circuitry 304 may use RT 20 as a key to search route eligibility table 115 (stored in memory 308) for a record (e.g., record 117B) for RT 20. Upon identifying record 117B, control circuitry 304 may retrieve record 117B from route eligibility table 115. After retrieving record 117B, control circuitry 304 parses record 117B to find identifiers of other PE devices associated with RT 20. For example, control circuitry 304 may extract, from record 117B, an identifier of another PE device (e.g., PE device 130). After retrieving the identifier of the other PE device, process 700 separates into two paths and proceeds to both block 708 and block 714 (of FIG. 7B).

At block 708, control circuitry 304 transmits, to the PE device whose identifier was retrieved at block 706, the route advertisement received at block 702. For example, control circuitry 304 may transmit route advertisement 125 to PE device 130.

At block 710, control circuitry 304 determines whether the record identified at block 706 associates another PE device with the RT extracted at block 704. For example, control circuitry 304 may parse record 117B to determine if record 117B includes an identifier for another PE device. In the example shown in FIG. 1, record 117B for RT 20 in route eligibility table 115 includes an identifier of PE device 120 and an identifier of PE device 130. Thus, the control circuitry 304 may determine that record 117B for RT 20 does not include an identifier for another PE device other than PE device 120 and PE device 130. In response to determining that the record associates another PE device with the RT, process 700 proceeds to block 712 where control circuitry 304 transmits the route advertisement received at block 702 to the PE device identified at block 710. Thereafter, process 700 returns to block 710, where control circuitry 304 determines whether the record identified at block 706 associates another PE device with the RT extracted at block 704. In response to determining that the record does not associate another PE device with the RT, control circuitry 304 does not transmit the route advertisement received at block 702 to other PE devices, and process 700 proceeds to block 713.

At block 713, control circuitry 304 determines whether the route advertisement, received at block 702, includes another RT. For example, control circuitry 304 may determine whether a predetermined data field of route advertisement 125 includes another RT that is different from the RT extracted at block 704. In response to determining that the route advertisement includes another RT, process 700 returns to block 704, where control circuitry 304 extracts the other RT from the route advertisement. In response to determining that the route advertisement does not include another RT, process 700 ends. In some embodiments, control circuitry 304 refrains from transmitting the route advertisement received at block 702 to other PE devices. For example, even though there are other PE devices on network 100, control circuitry 304 will not transmit route advertisement 125 to those other PE devices that are not associated with RT 20 in record 117B.

At block 714 of FIG. 7B, control circuitry 304 identifies a route advertised by the other PE device (identified at block 706), the route including the same RT as extracted at block 704. For example, control circuitry 304 may retrieve, from a routing table stored in storage 308, a route that was advertised by PE device 130 and that included RT 20. In some embodiments where import and export RTs are asymmetric, control circuitry 304 may use an import RT (the extraction of which is described below with reference to FIGS. 8A and 8B) as a key when searching the routing table for other routes including RT 20. Next, at block 716, control circuitry 304 generates a route advertisement for the route (identified at block 714) advertised by the other PE device (identified at block 706). For example, control circuitry 304 may generate route advertisement 135 including the route identified at block 714. Thereafter, at block 718, control circuitry 304 transmits the route advertisement generated at block 716 to the PE device from which the initial route advertisement was received at block 702. For example, if the record for RT 20 already exists but PE device 120 is not associated with the record (i.e., an identifier of PE device 120 is not included in the record), another PE device must have previously provided a route advertisement for the VLAN identified by RT 20. Thus, when control circuitry 304 receives route advertisement 125 including RT 20 from PE device 120, control circuitry 304 provides route advertisement 125 to PE device 130, and also transmits a route advertisement (e.g., route advertisement 135) including the previously received route for the VLAN identified by RT 20 to PE device 120.

Figure 8A:
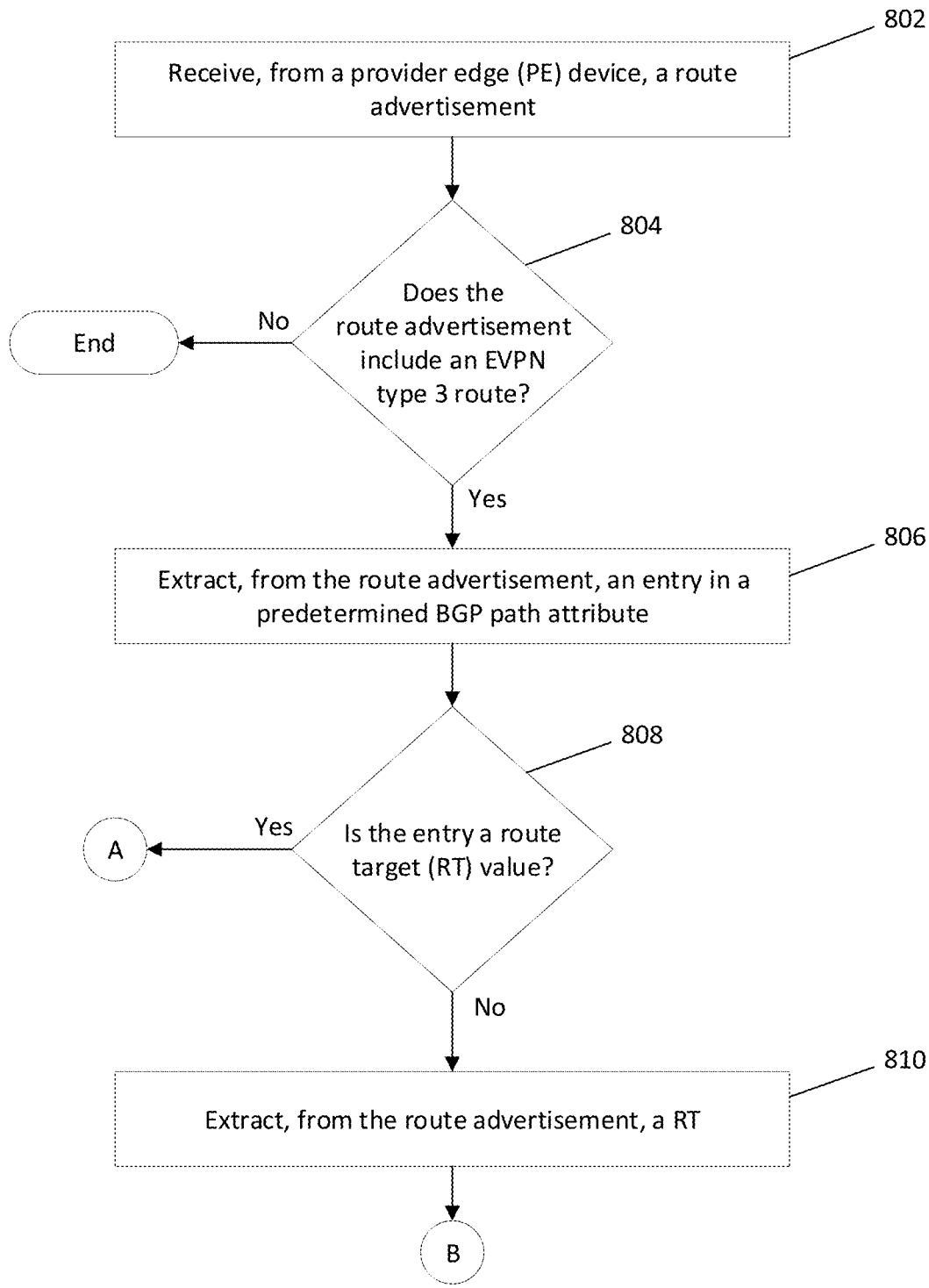
FIG. 8A is a flowchart of an illustrative process for building a RT table, in accordance with some embodiments of the present disclosure.
Figure 8B:
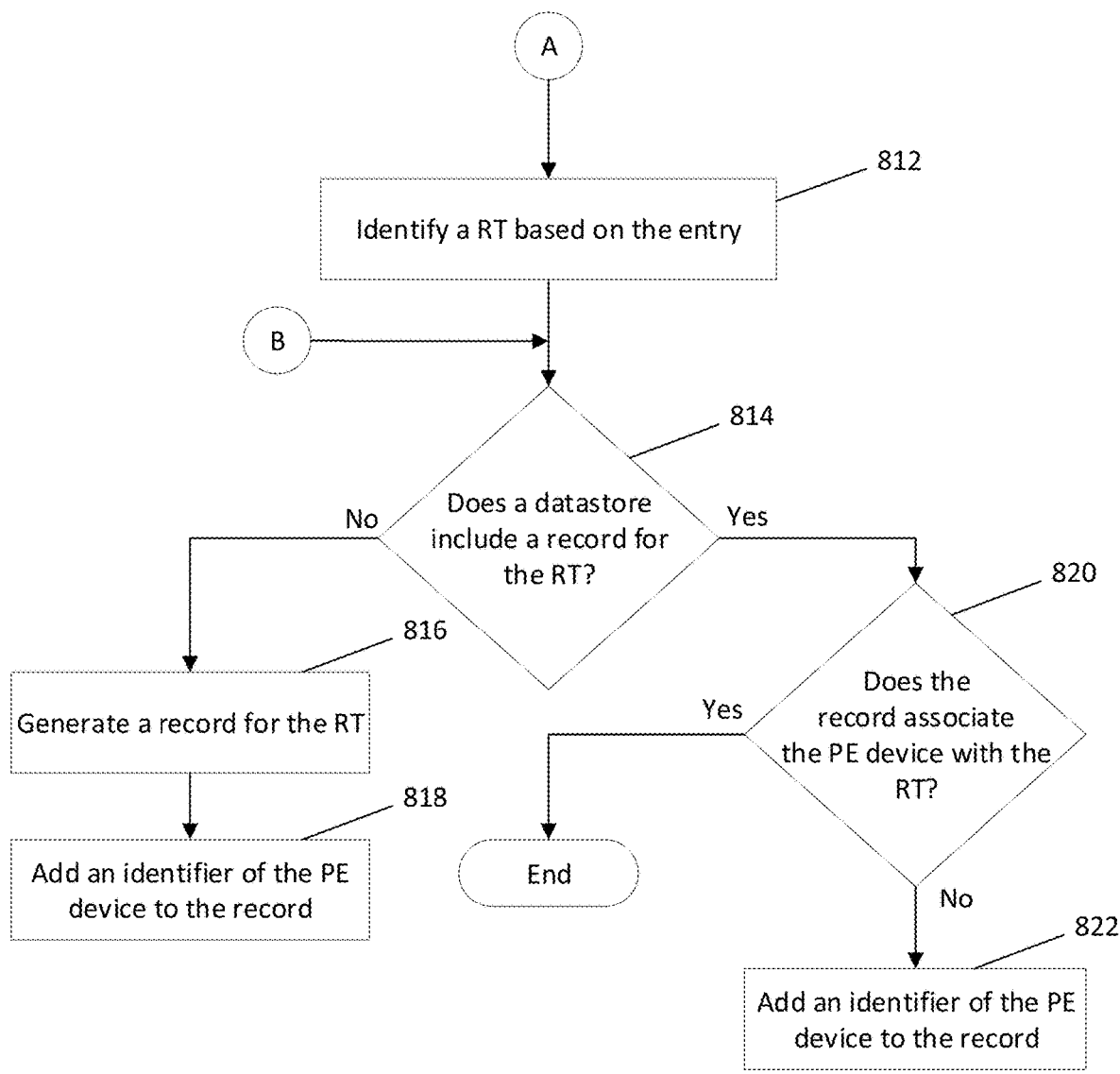
FIG. 8B shows additional aspects of the procedure of FIG. 8A, in accordance with some embodiments of the present disclosure.

FIGS. 8A and 8B show a flowchart of an illustrative process 800 for building a RT table, in accordance with some embodiments of the present disclosure. In particular, process 800 extracts RTs (specifically, import RTs) from route advertisements and builds a route eligibility table associating the RTs with identifiers of PE devices that have advertised routes including the RTs.

Process 800 may begin at block 802, where control circuitry, such as control circuitry 304 of device 300 (FIG. 3), receives a route advertisement from a PE device. For example, control circuitry 304 receives route advertisement 125 from PE device 120. As noted above, route advertisement 125 includes one or more data fields (e.g., fields 0, 1, 2, and 3, as shown in FIG. 1), at least one of which includes a RT (e.g., RT 20 in the example shown in FIG. 1) identifying a VLAN. For example, the RT may be included in a route target path attribute included in the route advertisement. In some embodiments, the route advertisement further includes a RT value (e.g., an import RT, a partial import RT, or another value to which an import RT can be mapped or from which an import RT can be derived) in a non-route target path attribute. For example, route advertisement 125 may include a RT value in a BGP community attribute and/or a BGP extended community attribute. Control circuitry 304 may receive route advertisement 125 via a network interface (e.g., network interface 310A of FIG. 3). In some embodiments, route advertisement 125 includes multiple RTs in one or more route target path attributes, and/or multiple RT values in one or more non-route target path attributes.

At block 804, control circuitry 304 determines whether the route advertisement received at block 802 includes an EVPN type 3 route. For example, control circuitry 304 may determine whether route advertisement 125 includes an EVPN type 3 route based on a format and/or syntax of a route included in route advertisement 125. In response to determining that the route advertisement received at block 802 does not include an EVPN type 3 route, process 800 ends. In response to determining that the route advertisement received at block 802 includes an EVPN type 3 route, process 800 proceeds to block 806.

At block 806, control circuitry 304 extracts, from the route advertisement received at block 802, an entry in a predetermined BGP path attribute. For example, control circuitry 304 may extract data included in a predetermined non-route target path attribute. Thereafter, at block 808, control circuitry 304 determines whether the entry extracted at block 806 is a RT value. For example, control circuitry 304 may determine whether the format and/or syntax of the data extracted at block 806 corresponds to the format and/or syntax of a RT. Control circuitry 304 may further determine if the format and/or syntax of the data extracted at block 806 corresponds to a format or syntax to which a RT can be mapped or from which a RT can be derived. In response to determining that the entry extracted at block 806 is a RT value, process 800 proceeds to block 812 of FIG. 8B, where control circuitry 304 identifies a RT based on the entry extracted at block 806. For example, control circuitry 304 may map or derive a RT from the RT value extracted at block 806.

In response to determining that the entry extracted from the non-route target path attribute at block 806 is not an RT value, process 800 proceeds to block 810. At block 810, control circuitry 304 extracts, from the route advertisement received at block 802, a RT. For example, control circuitry 304 extracts, from a route target path attribute, a RT (e.g., RT 20). Thereafter, at block 814 of FIG. 8B, control circuitry 304 determines whether a datastore includes a record for the RT (e.g., RT 20) extracted at block 810 or identified at block 812. For example, control circuitry 304 may determine whether route eligibility table 115 (stored in memory 308) includes a record for RT 20. Control circuitry 304 may search route eligibility table 115 using RT 20 as a key to determine whether route eligibility table 115 includes a record for RT 20. In response to determining that the datastore does not include a record for the RT, process 800 proceeds to block 816. In response to determining that the datastore includes a record for the RT, process 800 proceeds to block 820.

At block 816, control circuitry 304 generates a record for the RT extracted at block 810 or identified at block 812. For example, control circuitry 304 may add an entry to route eligibility table 115 for RT 20. Thereafter, at block 818, control circuitry 304 adds an identifier of the PE device (from which the route advertisement was received at block 802) to the record. For example, control circuitry 304 may add an identifier of PE 120 to the record generated at block 816.

At block 820, control circuitry 304 determines whether the record associates the PE device, from which the route advertisement was received at block 802, with the RT extracted at block 810 or identified at block 812. For example, control circuitry 304 may determine whether record 117B associates PE device 120 with RT 20. In some embodiments, control circuitry 304 may parse record 117B to determine whether the record includes an identifier for PE device 120. In response to determining that the record associates the PE device, from which the route advertisement was received, with the RT, process 800 ends. In response to determining that the record does not associate that PE device with the RT, process 800 proceeds to block 822.

At block 822, control circuitry 304 adds an identifier of the PE device, from which the route advertisement was received at block 802, to the record identified at block 814. For example, control circuitry 304 may add an identifier of PE 120 to the record. In some embodiments, process 800 proceeds to block 714 of FIG. 7B after completing the steps of block 822.

Figure 9:
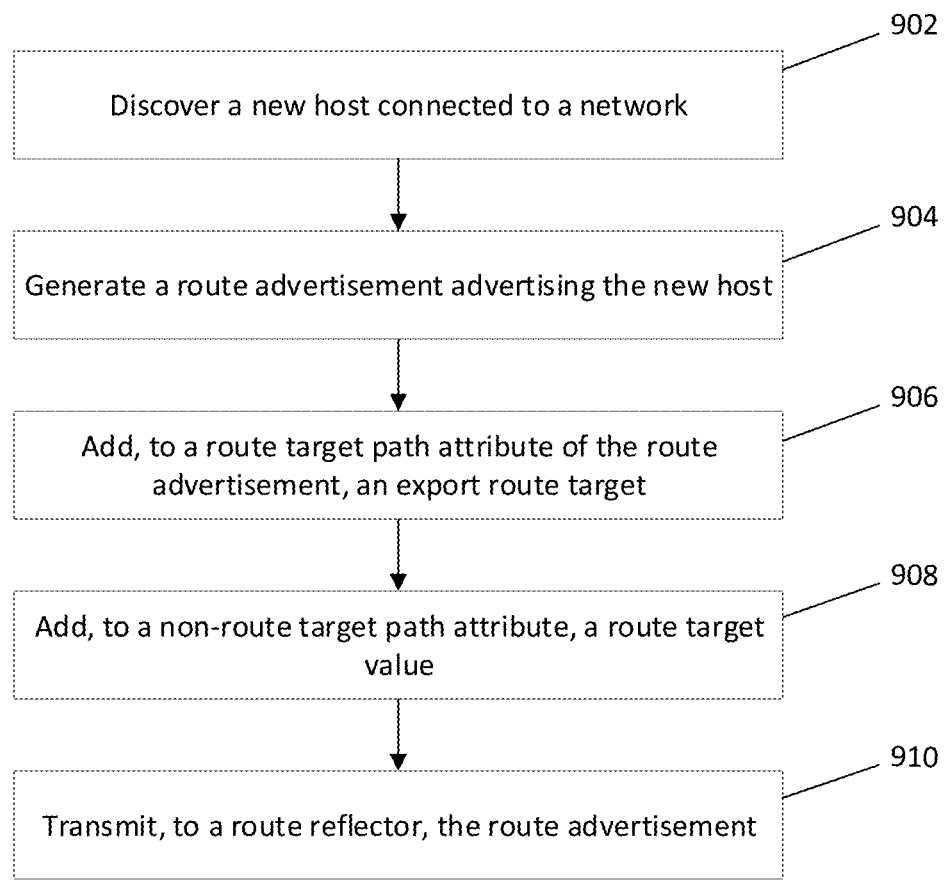
FIG. 9 is a flowchart of an illustrative process for generating a route advertisement including an import route target, in accordance with some embodiments of the present disclosure.

FIG. 9 is a flowchart of an illustrative process 900 for generating a route advertisement including an import route target, in accordance with some embodiments of the present disclosure. In particular, process 900 generates route advertisements including both an export RT in a route target path attribute and an import RT in a non-route target path attribute.

Process 900 may begin at block 902, where control circuitry, such as control circuitry 304 of device 300 (FIG. 3), discovers a new host connected to a network. For example, control circuitry 304 may receive or detect a gratuitous address announcement (e.g., a gratuitous address resolution protocol (ARP) request, a gratuitous ARP reply, and/or a gratuitous neighbor discovery protocol (NDP) neighbor announcement) from the new host connected to the device 300.

At block 904, control circuitry 304 generates a route advertisement advertising the new host discovered at block 902. For example, control circuitry 304 may generate a route advertisement advertising a path to the new host. At block 906, control circuitry 304 adds, to a route target path attribute of the route advertisement generated at block 904, an export route target. For example, control circuitry 304 may identify an export route target of the VLAN that includes the new host and include that export route target in the route target path attribute of the route advertisement generated at block 904.

At block 908, control circuitry 304 adds, to a non-route target path attribute of the route advertisement generated at block 904, a route target value. For example, control circuitry 304 may identify an import route target of the VLAN that includes the new host, and include that import route target (or another value to which that import route target can be mapped or from which that import route target can be derived) in the non-route target path attribute of the route advertisement generated at block 904. Thereafter, at block 910, control circuitry 304 transmits the route advertisement to a route reflector. For example, control circuitry 304 may transmit the route advertisement generated at block 904 to route reflector 110.

Figure 10:
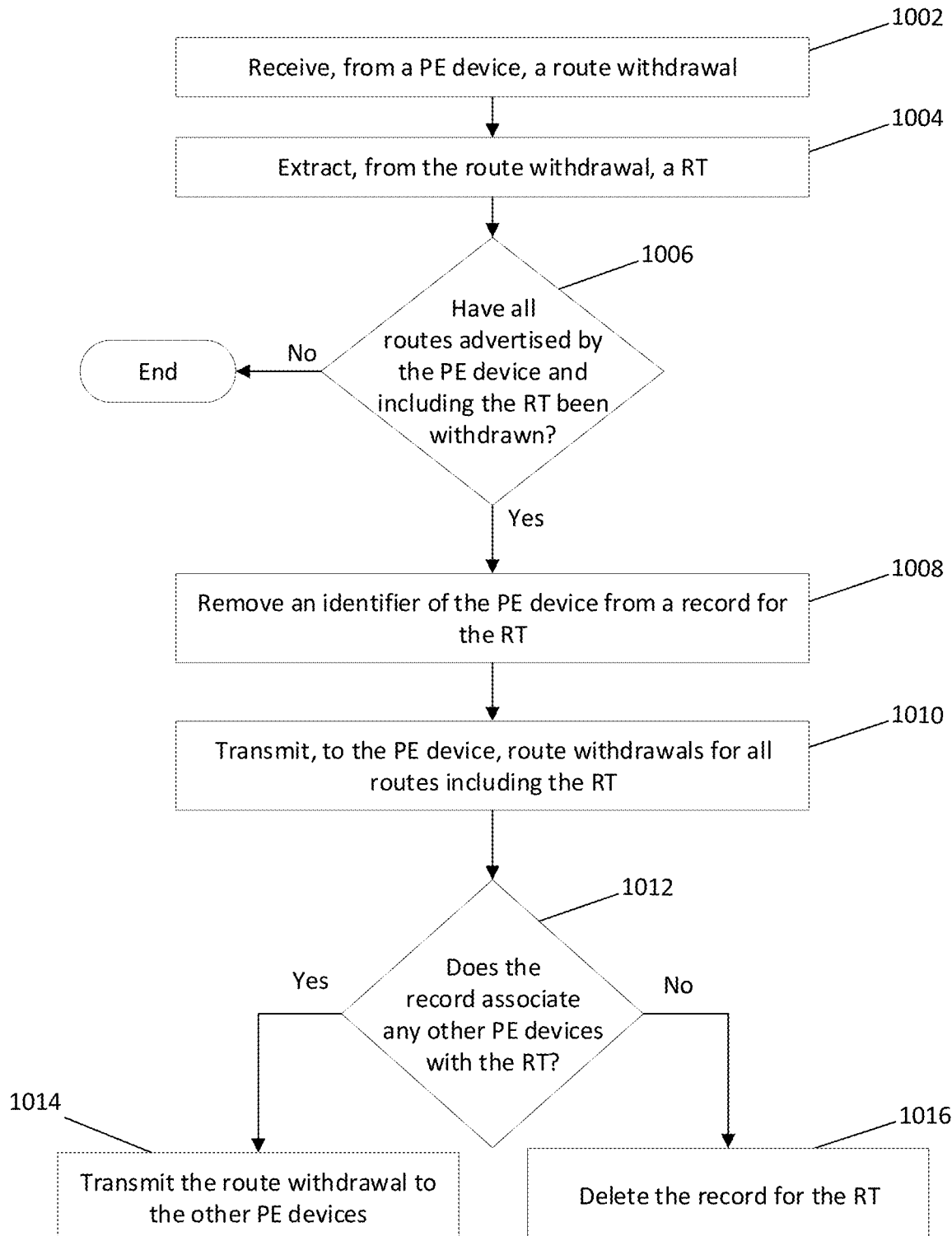
FIG. 10 is a flowchart of an illustrative process for deleting an identifier of a PE device from a record for a RT, in accordance with some embodiments of the present disclosure.

FIG. 10 is a flowchart of an illustrative process 1000 for removing an identifier of a PE device from a record for a RT, in accordance with some embodiments of the present disclosure. Process 1000 may begin at block 1002, where control circuitry, such as control circuitry 304 of device 300 (FIG. 3), receives, from a PE device, a route withdrawal. For example, control circuitry 304 receives a route withdrawal from PE device 120. The route withdrawal may include fields similar to the fields of route advertisement 125 (described above with reference to FIG. 1), at least one of which includes a RT (e.g., RT 20 in the example shown in FIG. 1) identifying a VLAN. For example, the RT may be included in a field of an MPLS label included in the route advertisement. Control circuitry 304 may receive the route withdrawal via a network interface (e.g., network interface 310A of FIG. 3). In some embodiments, the route withdrawal includes multiple RTs.

At block 1004, control circuitry 304 extracts, from the route withdrawal received at block 1002, a RT. In some embodiments, where import and export RTs are asymmetric, control circuitry 304 extracts an import RT (the process for extracting an import RT is described above with reference to FIGS. 8A and 8B) from the route withdrawal. For example, control circuitry 304 extracts, from the route withdrawal, RT 20. Control circuitry 304 may extract the RT by retrieving data from a predetermined data field of the route withdrawal. The predetermined data field may be a data field that is designated for the RT or an RT value, as described above with reference to FIGS. 8A and 8B.

At block 1006, control circuitry 304 determines whether all routes advertised by the PE device that include the same RT as the route withdrawn at block 1002 have been withdrawn. In other words, control circuitry 304 determines whether any routes advertised by the PE device that include the same RT as the route withdrawn at block 1002 have not been withdrawn and thus are still active. For example, control circuitry 304 may search a routing table, stored in storage 308, for all routes advertised by the PE, and then filter out any routes that do not include RT 20. In response to determining that all routes advertised by the PE device that included RT 20 have not yet been withdrawn, process 1000 ends. In response to determining that all routes advertised by the PE device that included RT 20 have been withdrawn, process 1000 proceeds to block 1008.

At block 1008, control circuitry 304 removes an identifier of the PE device from a record for the RT. For example, control circuitry 304 may remove, from the record generated at block 816, the identifier of the PE device that was added to the record at block 818.

At block 1010, control circuitry 304 transmits, to the PE device, route withdrawals for all routes that include the RT and were previously advertised to the PE device. For example, control circuitry 304 may identify all the routes that were previously advertised to the PE device at block 718, and transmit, to the PE device, route withdrawals for all those routes.

At block 1012, control circuitry 304 determines whether the record for the RT associates any other PE devices with the RT. For example, control circuitry 304 may determine whether the record for the RT that was identified at block 814 includes identifiers of other PE devices. In response to determining that the record for the RT associates other PE devices with the RT, process 1000 proceeds to block 1014. In response to determining that the record for the RT does not associate other PE devices with the RT, and thus the record for the RT is not associated with any PE devices after the identifier of the PE device is removed at block 1008, process 1000 proceeds to block 1016.

At block 1014, control circuitry 304 transmits the route withdrawal, received at block 1002, to the other PE devices. For example, control circuitry 304 may retrieve, from the record for the RT, identifiers of the other PE devices associated with the RT and transmit the route withdrawal received at block 1002 to those PE devices.

At block 1016, control circuitry 304 deletes the record for the RT. For example, control circuitry 304 removes the record for RT 20 from route eligibility table 115.

While the processes 400, 500, 600, 700, 800, 900, and 1000 described above illustrate a single iteration of the operations performed on using a single VNI or a single RT, those skilled in the art will appreciate that these processes may be iteratively repeated when there are multiple VNIs or multiple RTs included in a route advertisement. The processes 400, 500, 600, 700, 800, 900, and 1000 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for providing route advertisements to provider edge devices on a virtual private network, the method comprising:
   receiving, from a first provider edge device, a first route advertisement comprising a plurality of path attributes, the plurality of path attributes including a first route target path attribute and a non-route target path attribute;
   determining whether the non-route target path attribute includes a route target value;
   in response to determining that the non-route target path attribute includes a route target value:
   extracting, from the route target value included in the non-route target path attribute, a route target; and
   determining whether a datastore associating provider edge devices with route targets includes a record for the route target;
   in response to determining that the datastore does not include a record for the route target, generating, for the datastore, a record comprising the route target and an identifier of the first provider edge device;
   receiving, from a second provider edge device, a second route advertisement comprising a second route target path attribute;
   extracting, from the second route target path attribute of the second route advertisement, the route target;
   determining that the datastore includes the generated record comprising the route target; and
   in response to determining that the datastore includes the generated record comprising the route target:
   retrieving, from the generated record, the identifier of the first provider edge device; and
   transmitting, to the first provider edge device, the second route advertisement.

2. The method of claim 1, further comprising:
   identifying a third route advertisement including the route target; and
   transmitting, to the second provider edge device, the third route advertisement.

3. The method of claim 1, further comprising:
   refraining from transmitting the second route advertisement to a third provider edge device that is not included in the record.

4. The method of claim 1, further comprising:
   in response to determining that the datastore includes a record for the route target, determining whether the record includes the identifier of the first provider edge device; and
   in response to determining that the record does not include the identifier of the first provider edge device, adding the identifier of the first provider edge device to the record.

5. The method of claim 1, further comprising:
   in response to determining that the non-route target path attribute does not include a route target value:
   extracting, from the route target path attribute, the route target;
   determining whether the datastore includes a record for the route target; and
   in response to determining that the datastore does not include a record for the route target, generating, for the datastore, a record comprising the route target and the identifier of the provider edge device.

6. The method of claim 5, further comprising:
   determining whether the first route advertisement includes a third route target path attribute;
   in response to determining that the first route advertisement includes a third route target path attribute:
   extracting, from the third route target path attribute, a third route target;
   determining whether the datastore includes a record for the third route target; and
   in response to determining that the datastore does not include a record for the third route target, generating, for the datastore, a record comprising the third route target and the identifier of the provider edge device.

7. The method of claim 1, wherein the first route advertisement includes an ethernet virtual private network (EVPN) type 3 route.

8. The method of claim 1, wherein the first route target path attribute comprises a route target extended community attribute.

9. The method of claim 1, wherein the route target is a first route target, the method further comprising:
   determining whether a second non-route target path attribute of the first route advertisement includes a second route target value;
   in response to determining that the second non-route target path attribute includes a second route target value:
   extracting, from the second route target value included in the second non-route target path attribute, a second route target;
   determining whether the datastore includes a record for the second route target; and
   in response to determining that the datastore does not include a record for the second route target, generating, for the datastore, a record comprising the second route target and an identifier of the provider edge device.

10. The method of claim 1, further comprising:
in response to determining that the datastore includes a record for the second route target, determining whether the record includes the identifier of the provider edge device; and
in response to determining that the record does not include the identifier of the provider edge device, adding the identifier of the first provider edge device to the record.

11. The method of claim 1, wherein the route target value comprises one or more of an import route target, a partial import route target, or a value from which an import route target can be derived.

12. The method of claim 1, wherein the first provider edge device comprises a network device that connects to and advertises network reachability information for one or more virtual private networks.

13. The method of claim 1, further comprising:
receiving, from the first provider edge device, a route withdrawal including the route target;
determining whether all routes that were advertised by the first provider edge device and included the route target have been withdrawn; and
in response to determining that all routes that were advertised by the first provider edge device and included the route target have been withdrawn, removing the identifier of the first provider edge device from the record for the route target.

14. The method of claim 13, further comprising:
determining whether the record includes an identifier of another provider edge device;
in response to determining that the record includes an identifier of another provider edge device, transmitting the route withdrawal to the other provider edge device; and
in response to determining that the record does not include an identifier of another provider edge device, deleting the record.

15. The method of claim 13, further comprising:
identifying a route that was previously advertised to the first provider edge device, the route including the route target; and
transmitting, to the first provider edge device, a route withdrawal for the identified route.

16. A system for providing route advertisements to provider edge devices on a virtual private network, the system comprising:
a network interface configured to:
receive, from a first provider edge device, a first route advertisement comprising a plurality of path attributes, the plurality of path attributes including a first route target path attribute and a non-route target path attribute; and
receive, from a second provider edge device, a second route advertisement comprising a second route target path attribute; and
control circuitry configured to:
determine whether the non-route target path attribute includes a route target value;
in response to determining that the non-route target path attribute includes a route target value:
extract, from the route target value included in the non-route target path attribute, a route target; and
determine whether a datastore associating provider edge devices with route targets includes a record for the route target;
in response to determining that the datastore does not include a record for the route target, generate, for the datastore, a record comprising the route target and an identifier of the first provider edge device;
extract, from the second route target path attribute of the second route advertisement, the route target;
determine that the datastore includes the generated record comprising the route target;
in response to determining that the datastore includes the generated record comprising the route target:
retrieve, from the generated record, the identifier of the first provider edge device; and
transmit, via the network interface to the first provider edge device, the second route advertisement.

17. The system of claim 16, wherein the control circuitry is further configured to:
identify a third route advertisement including the route target; and
transmit, via the network interface to the second provider edge device, the third route advertisement.

18. The system of claim 16, wherein the control circuitry is further configured to refrain from transmitting the second route advertisement to a third provider edge device that is not included in the record.

* * * * *